(12) United States Patent
Varcus

(10) Patent No.: US 6,848,714 B2
(45) Date of Patent: Feb. 1, 2005

(54) AIRBAG MODULE

(75) Inventor: Johannes-Alexander Varcus, Sprockhoevel (DE)

(73) Assignee: Delphi Technologies, Inc., Troy, MI (US)

( * ) Notice: Subject to any disclaimer, the term of this patent is extended or adjusted under 35 U.S.C. 154(b) by 65 days.

(21) Appl. No.: 10/220,834
(22) PCT Filed: Feb. 14, 2001
(86) PCT No.: PCT/EP01/01625
§ 371 (c)(1), (2), (4) Date: Nov. 18, 2002
(87) PCT Pub. No.: WO01/66385
PCT Pub. Date: Sep. 13, 2001

(65) Prior Publication Data
US 2003/0151233 A1 Aug. 14, 2003

(30) Foreign Application Priority Data
Mar. 7, 2000 (DE) .......................... 100 11 066

(51) Int. Cl.⁷ .............................................. B60R 21/16
(52) U.S. Cl. .................................................. 280/743.1
(58) Field of Search ............................ 280/743.1, 729, 280/740, 742

(56) References Cited
U.S. PATENT DOCUMENTS

| 5,249,824 A | * 10/1993 | Swann et al. ............... 280/729 |
| 5,687,986 A | * 11/1997 | Nelsen et al. ............ 280/728.2 |
| 6,135,492 A | 10/2000 | Zimmerbeutel et al. |
| 6,283,499 B1 | * 9/2001 | Nelsen et al. ............... 280/729 |
| 6,286,858 B1 | 9/2001 | Sheperd et al. |
| 6,361,064 B1 | 3/2002 | Hopf et al. |
| 6,361,067 B1 | * 3/2002 | Varcus et al. ............... 280/729 |
| 6,422,589 B1 | 7/2002 | Ostermann et al. |
| 6,478,331 B1 | * 11/2002 | Lang .......................... 280/740 |
| 6,565,113 B2 | 5/2003 | Kassman et al. |
| 6,626,455 B2 | 9/2003 | Webber et al. |

FOREIGN PATENT DOCUMENTS

| DE | 29818946 | * 4/1999 |
| DE | 19940395 | * 3/2000 |
| EP | 1013514 | * 6/2000 |
| JP | 07156730 | * 6/1995 |
| WO | 99/42332 | * 8/1999 |

* cited by examiner

Primary Examiner—Eric Culbreth
(74) Attorney, Agent, or Firm—Scott A. McBain

(57) ABSTRACT

The invention relates to an airbag module for motor vehicles, comprising an inflatable airbag (12) and a deflection pocket which is arranged in the region of an inflow opening of the airbag and which consists of at least two material layers, of which a lower layer (16a) has a flow-through opening (18) which is aligned with the inflow opening and is at least partly covered over by an upper layer (16b), and is secured at a holder element (22) for the airbag, with the upper layer being connected region-wise to the lower layer for forming radial gas propagation paths (24) for gas flowing via the deflection pocket into the airbag.

9 Claims, 2 Drawing Sheets

AIRBAG MODULE

TECHNICAL FIELD

The invention relates to an airbag module for motor vehicles, comprising an inflatable airbag.

BACKGROUND OF THE INVENTION

In airbag modules of this kind the airbag should deploy as rapidly as possible in the event of an accident in order to protect the vehicle passenger in the inflated state.

The problem (object) of the invention is to create a possibility of optimally protecting vehicle passengers by means of an airbag which can be inflated in the event of an accident, with it being desirable in particular for an optimal protection to be given even when the relevant vehicle passenger does not assume his normal seated position.

SUMMARY OF THE INVENTION

This object is satisfied by an airbag module that includes a deflection pocket which is arranged in the region of an inflow opening of the airbag and which consists of at least two material layers lying one above the other, of which a lower layer has a flow-through opening which is aligned with the inflow opening and is at least partly covered over by an upper layer, and is secured to a holder element for the airbag, with the upper layer being connected region-wise to the lower layer for forming approximately radial gas propagation paths for gas which flows via the deflection pocket into the airbag.

The deflection pocket in accordance with the invention ensures that gas which is expelled by a gas generator does not flow directly into the airbag, but into the deflection pocket first. After the gas has passed the flow-through opening of the lower layer of the deflection pocket, it encounters the upper layer, which at least partly covers over the flow-through opening. Since the upper layer is connected to the lower layer and the lower layer is in turn secured to the holder element of the airbag module, the deflection pocket can not move in the axial inflation direction towards a vehicle passenger, but rather the gas is deflected in such a manner by the upper layer that it flows along the radial gas propagation paths of the deflection pocket, which extend perpendicular to the axial inflation direction, and emerges from the deflection pocket in the radial direction and enters into the airbag.

In the airbag module in accordance with the invention the airbag is thus first inflated in the radial direction; i.e. through the invention an initial radial deploying of the airbag is achieved. The deflection pocket which is formed by the material layers which are connected region-wise to one another thus ensures in accordance with the invention that during the inflation of the airbag an impact surface with large radial dimensions is first created before the airbag can deploy axially in the direction of a vehicle passenger. The airbag can thus not deploy past the vehicle passenger during the inflation or thrust the vehicle passenger against the inner wall of the vehicle. Inflation induced injuries—IIIs—are consequently prevented through the invention.

The gas propagation paths can be configured in dependence on the respective conditions in such a manner that the gas flows into the airbag distributed in the desired way over the periphery of the deflection pocket. In this the deflection pocket in accordance with the invention thus has not only a deflector function for deflecting the gas flow, but also a diffuser function for the optimal distribution of the gas in the airbag.

The material layers can be manufactured of a flexible material, e.g. textile or fabric material, so that they form a flexible deflection pocket by means of which the gas flow can be deflected and distributed in the respective desired way.

An advantage of a flexible deflection pocket consists in that the latter can reach up to possibly present lateral side walls of a cover or cap of the airbag module or, respectively, extend over side walls of this kind. Through this the gas flow can be deflected into a direction which is not dangerous for the relevant vehicle passenger.

A further advantage of the invention is that the radial deployment is realized in a particularly simple and efficient way in that merely the deflection pocket, which is formed of the material layers which lie one above the other, is provided. Complicated structures within the airbag such as for example inner walls, layers or lobes, which extend through the entire airbag, and elaborate measures for connecting structures of this kind to the actual airbag sheath are in accordance with the invention not required. Likewise, complicated tethers or holder band arrangements within the airbag can be dispensed with. The weight of the airbag module and its manufacturing costs are practically not increased through the deflection pocket in accordance with the invention.

A further advantage of the invention consists in that the material layers which form the deflection pocket protect the airbag from the heat which arises during the triggering of the gas generator.

Whereas it is possible in principle that the two material layers are formed by a single connected sheet of material, it is preferred when the deflection pocket is formed not by a single e.g. sleeve-like or bag-like piece of material, but rather by at least two separate material layers.

In a preferred practical embodiment of the invention the lower layer is formed of a material layer which is provided as a heat shield for the airbag. In this a constituent of the airbag module which is present anyway is used for forming the deflection pocket in accordance with the invention. The weight and manufacturing costs of the airbag module in accordance with the invention are reduced still further through this. This execution has a particularly advantageous effect on the manufacture of the airbag module since it is merely necessary to apply an additional material layer to the material layer which forms the heat shield. Thus an additional deflector or diffuser function respectively can hereby be imparted to the heat shield of the airbag module, with the additional upper layer at the same time increasing the heat protection function of the lower layer.

In a further exemplary embodiment of the invention the holder element is designed in the shape of a ring, with both the inflow opening of the airbag and the flow-through opening of the lower layer being bounded by the holder element. With a holder element of this kind it is for example possible to secure both the airbag and the lower layer of the deflection pocket, e.g. through clamping in at the airbag module, in such a manner that the relative position of the airbag and the deflection pocket is reliably fixed and the inflow opening of the airbag and the flow-through opening of the deflection pocket are aligned with one another so that gas which is produced by a gas generator can flow via the inflow opening of the airbag and the flow-through opening of the lower layer into the deflection pocket.

It is particularly preferred when the lower layer and the upper layer are connected to one another at least at one line-shaped or strip-shaped connection location, with the connection location being formed by at least one seam. To form strip-shaped connection locations, double seams can also be provided. The material layers, which can for example consist of textile or fabric material, are thus simply sewn to one another to form the deflection pocket.

In principle the material layers which form the deflection pocket can be connected to one another in any desired manner, for example through adhesive bonding or welding.

The invention also relates to a method for manufacturing an airbag module for motor vehicles, in which at least one further material layer is applied in such a manner to at least one present material layer which is provided as a heat shield for the airbag that a deflection pocket with approximately radial gas propagation paths for gas which flows via the deflection pocket into the airbag is formed by the material layers.

Furthermore, the invention relates to the use of at least one material layer, which is provided as a heat shield for an airbag in an airbag module, as one of at least two material layers through which a deflection pocket is formed with approximately radial gas propagation paths for gas which flows via the deflection pocket into the airbag.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
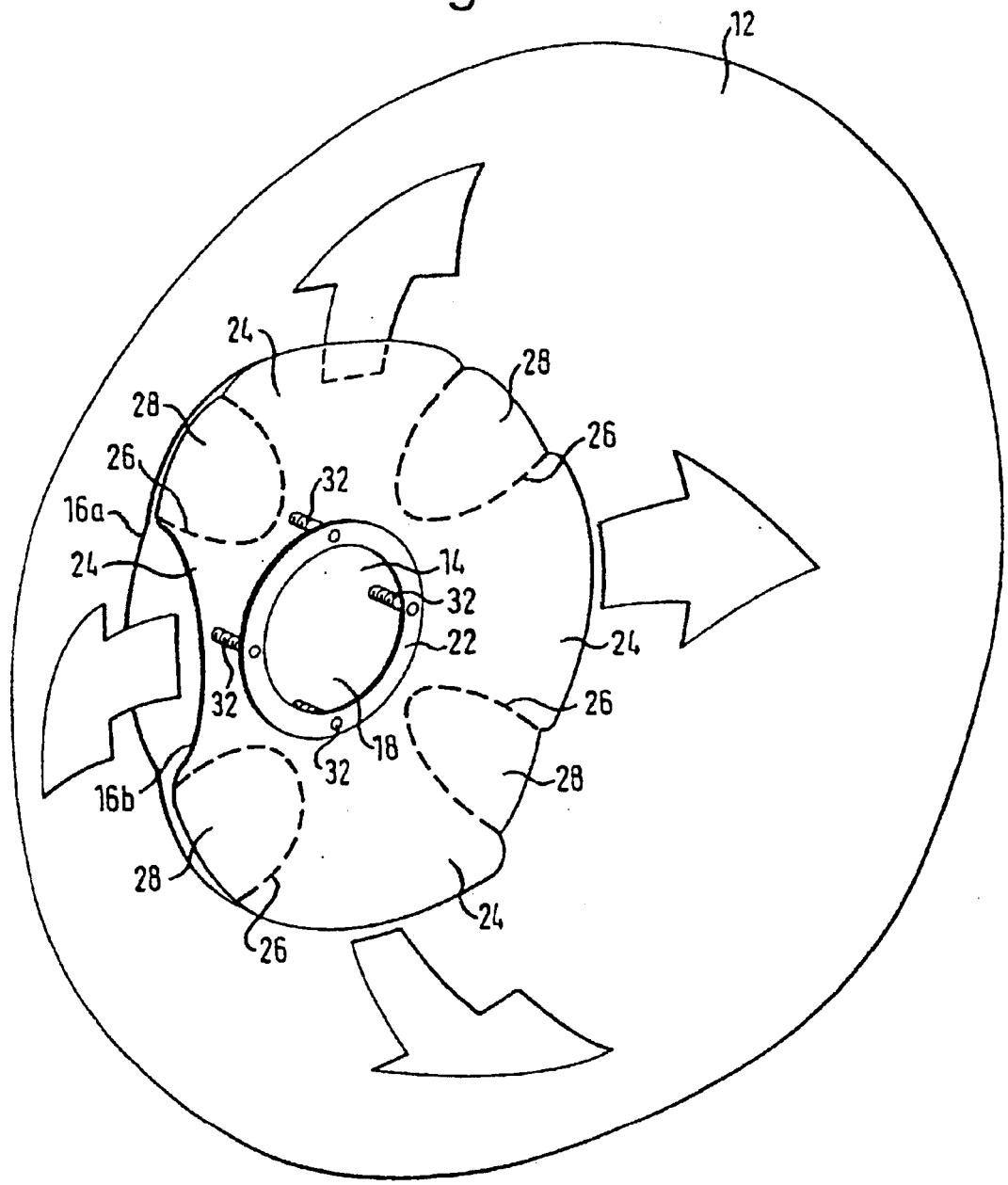
FIG. 1 is a schematically indicated airbag, a deflection pocket of a partly illustrated airbag module in accordance with an embodiment of the invention.

The deflection pocket in accordance with FIG. 1, which is formed of two material layers 16a, 16b and the construction of which will be explained in more detail in the following, can be secured together with the airbag 12 via an annular holder element 22 by means of securing elements 32 in the form of screws at a non-illustrated base part of the airbag module in accordance with the invention. The lower layer 16a forms the heat shield of the airbag module, which protects the airbag 12 against the heat which arises during the triggering of a non-illustrated gas generator.

A region of the airbag 12, which bounds an inflow opening 14 and which is also designated as the mouthpiece of the airbag 12, and a section of the lower material layer 16a which bounds a flow-through opening 18 of this material layer 16a are clamped at the airbag module by the holder ring 22. The inflow opening 14 of the airbag 12 and the flow-through opening 18 of the lower layer 16a are thus defined by the holder ring 22.

The lower layer 16a and the upper layer 16b of the deflection pocket which faces the vehicle interior in the vehicle are formed in each case circularly with the same outer dimensions. The upper layer 16b extends over the flow-through opening 18 of the lower material layer 16a, so that the flow-through opening 18 is completely covered over by the upper layer 16b. Alternatively it is also possible to provide the upper layer 16b with e.g. small hole-like or slit-like openings in the region of the flow-through opening 18 of the lower layer 16a, with the essential part of the flow-through opening 18 remaining covered over and the flow cross-section through these small openings in the upper layer 16b being small with respect to that of the flow-through opening 18 of the lower layer 16a.

The upper layer 16b extends over the holder ring 22 and is secured exclusively at connection locations formed by U-shaped seams 26 at the lower layer 16a which will be described in more detail in the following and is thus anchored at the airbag module via the lower layer 16a.

The upper layer 16b and the lower layer 16a are connected to one another by four U-shaped seams 26 which are uniformly spaced in the peripheral direction. The free ends of the U-limbs lie at the edge of the material layers 16a, 16b, whereas the vertex of the U is arranged at a small distance from the outer edge of the holder ring 22.

In this way a pocket for gas flow deflection with four radial gas propagation paths 24 is formed by the two material layers 16a, 16b, which are sewn together, the shape of which is predetermined by the course of the seams 26 and which are in each case bounded by two U-limbs of two adjacent U-seams 26. In the exemplary embodiment in accordance with FIG. 1 the radially outwardly widening gas propagation paths 24 have in each case a trumpet-like shape. The interior of each U-seam 26 forms an intermediate section 28 between two adjacent gas propagation paths 24 which is not available for gas propagation.

Gas which is expelled by the gas generator of the airbag module can thus flow via the inflow opening 14 of the airbag 12 and the flow-through opening 18 of the lower layer 16a into the deflection pocket which is formed by the two material layers 16a, 16b in which it strikes against the region of the upper layer 16b which covers over the flow-through opening 18. The gas is thereby deflected and conducted into the radially extending gas propagation paths 24 so that it flows completely through the gas propagation paths 24 and out of the deflection pocket 16a, 16b in the radial direction into the airbag 12, as is indicated in FIG. 1 by the large arrows.

In this way the airbag 12 is first inflated in the radial direction after the gas generator is triggered, so that an impact surface with large radial dimensions is first created before the airbag 12 is completely inflated in the axial inflation direction.

The upper layer 16b, which is applied to the heat shield of the airbag module which is formed by the lower layer 16a, reinforces the protective action of the heat shield and thus offers an additional protection for the airbag 12 against the heat which arises during the triggering of the gas generator.

Figure 2:
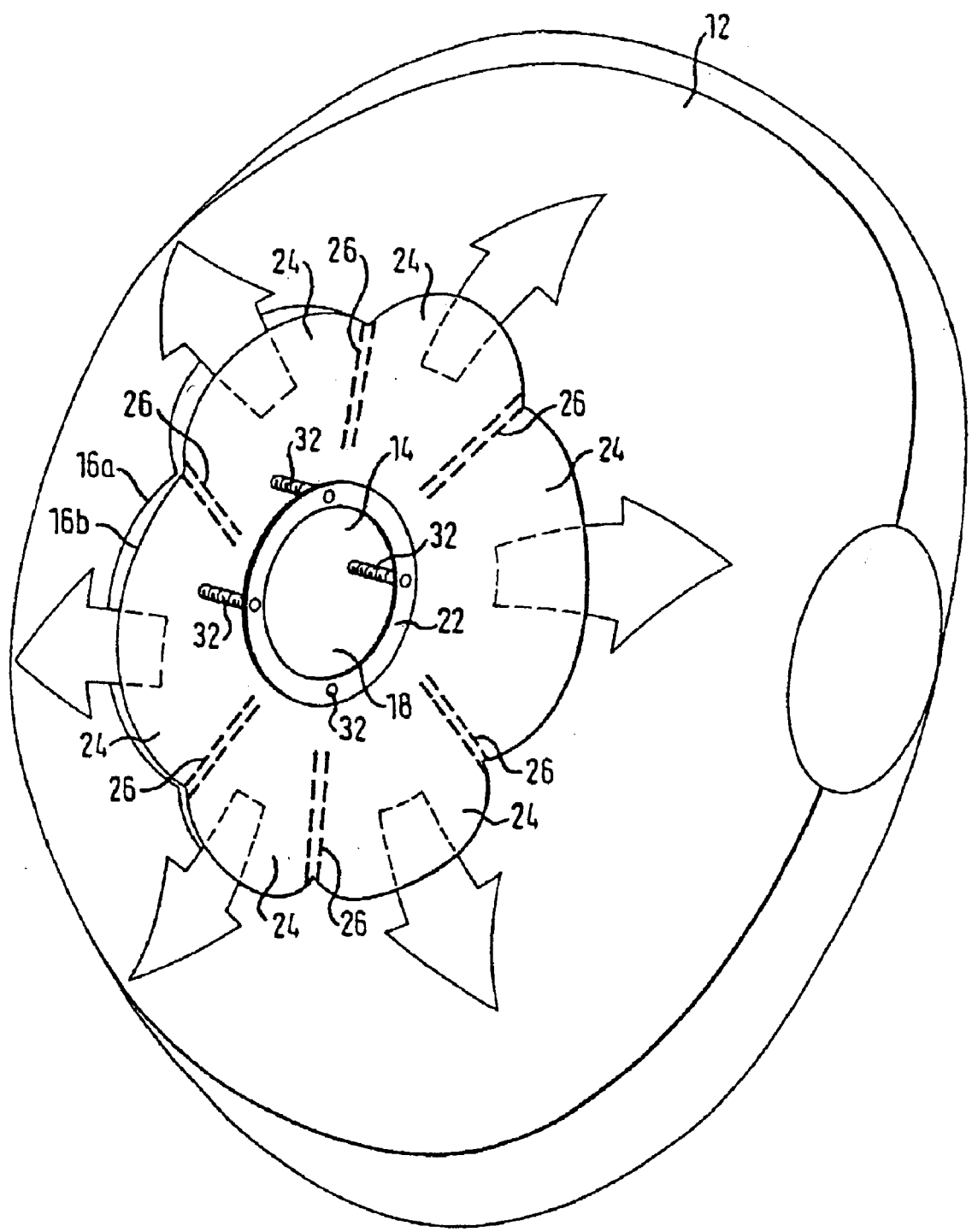
FIG. 2 is an illustration in accordance with FIG. 1 with a deflection pocket in accordance with a further embodiment of the invention.

The embodiment in accordance with FIG. 2 differs from the embodiment of FIG. 1 substantially through the number and the forming of the seams 26 connecting the two material layers 16a, 16b of the deflection pocket to one another.

In accordance with FIG. 2 six straight double seams 26 which extend in the radial direction are provided which in each case consist of two parallel individual seams and form in this way a strip-like connection location. The radially outer ends of the seams 26 lie at the edge of the two material layers 16a, 16b, whereas the radially inner ends of the seams 26 are in each case arranged at a small distance from the outer edge of the holder ring 22.

The seams 26 bound a total of six gas propagation paths 24 which widen outwardly in the manner of a funnel, with two mutually diametrically oppositely lying gas propagation paths 24 with relatively large opening angles being present, between which in each case a pair of adjacent gas propagation paths 24 with a somewhat smaller opening angle is located.

Gas which is expelled by the gas generator and which flows into the deflection pocket 16a, 16b is thus divided up over the six gas propagation paths 24 and enters distributed over the entire periphery of the deflection pocket 16a, 16b from the deflection pocket 16a, 16b in the radial direction into the airbag 12.

Therefore after the triggering of the gas generator a radial deployment of the airbag 12 again takes place first, before the latter is completely inflated in the axial direction.

In accordance with the invention the inflation behavior of the airbag 12 can be intentionally set, through the number and the forming of the seams 26 which connect the material layers 16a, 16b to one another, in such a manner that the airbag 12 optimally deploys first in the radial direction in dependence on the respective conditions.

In this the gas propagation paths 24 can be intentionally configured in dependence on the position of the airbag module in the motor vehicle and/or on the configuration of possibly present flaps of a cover or cap of the airbag module.

What is claimed is:

1. Airbag module for a motor vehicle comprising
an inflatable airbag having an inflow opening,
a deflection pocket disposed within the inflatable airbag, said deflection pocket comprising a first layer having a flow-through opening coextensive with the inflow opening, and a second layer overlying the first layer and covering the inflow opening, said second layer having an edge coextensive with said first layer and being connected to the first layer by a plurality of substantially U-shaped seams having free ends at said edge and extending toward said flow-through opening, said seams being spaced apart to form radial gas propagation paths for allowing gas to flow from said inflow opening into the airbag.

2. Airbag module in accordance with claim 1, wherein the deflection pocket is manufactured of at least two separate material layers.

3. Airbag module in accordance with claim 1, wherein the first layer is formed by a material layer which is provided as a heat shield for the airbag.

4. Airbag module in accordance with claim 1, further comprising a holder element formed in the shape of a ring, wherein the inflow opening of the airbag and the flow-through opening of the first layer are bounded by the holder element.

5. Airbag module in accordance with claim 1, wherein the deflection pocket is arranged substantially completely within the airbag at least when the airbag is inflated.

6. Airbag module in accordance with claim 1, wherein the deflection pocket has multiple gas propagation paths uniformly distributed about the flow-through opening.

7. Airbag module in accordance with claim 1, wherein the gas propagation paths have a trumpet-like shape.

8. Airbag module in accordance with claim 1, wherein the first layer and the second layer have at least substantially the same outer dimensions.

9. Airbag module in accordance with claim 1, wherein the first layer and the second layer are circular.

* * * * *